United States Patent [19]
Hendrickson

[11] 3,782,023
[45] Jan. 1, 1974

[54] SPINNING REEL LINE CLAMP

[75] Inventor: Doyle D. Hendrickson, Evansville, Wyo.

[73] Assignee: Reel Assist Corporation, Casper, Wyo.

[22] Filed: May 10, 1971

[21] Appl. No.: 141,517

[52] U.S. Cl. .................................................. 43/25
[51] Int. Cl. ............................................. A01k 87/00
[58] Field of Search .............................. 43/25, 25.2

[56] References Cited
UNITED STATES PATENTS

| 3,654,722 | 4/1972 | Camilleri | 43/25 |
| 2,804,711 | 9/1957 | Kozar | 43/25 |
| 2,846,804 | 8/1958 | Elliott | 43/25 |
| 3,164,334 | 1/1965 | Gris | 43/25 X |

*Primary Examiner*—Louis G. Mancene
*Assistant Examiner*—Daniel J. Leach
*Attorney*—Sheridan, Ross & Burton

[57] ABSTRACT

Spin fishing accessory for releasably securing the line at a point relative to the reel spool which prevents stripping line therefrom which may normally occur in its absence. In a preferred embodiment it comprises a lever member pivoted between its ends, one end forming a resiliently urged releasable clamping jaw, the other end forming a finger engaging portion for opening the jaw, and means for securing the member to the fishing apparatus. It is preferably secured to a part of the reel, such as the reel mounting shank, but may be secured to the reel butt when suitably proportioned.

5 Claims, 7 Drawing Figures

PATENTED JAN 1 1974
3,782,023
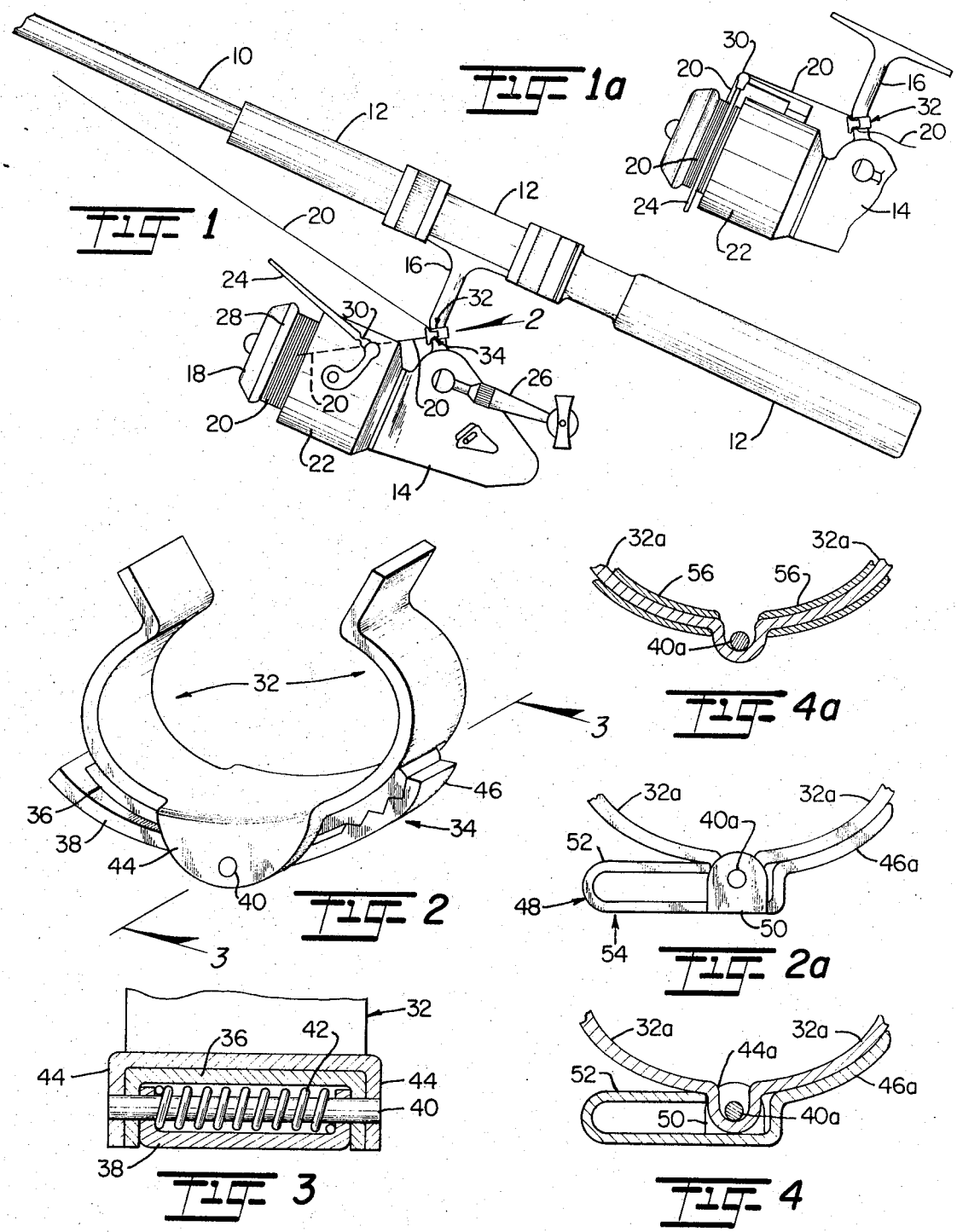
INVENTOR
DOYLE D. HENDRICKSON
BY Sheridan, Ross & Burton
ATTORNEYS

SPINNING REEL LINE CLAMP

BACKGROUND OF THE INVENTION

In the sport of fishing it is common practice to employ a rod having a spinning reel affixed to the butt thereof which is provided with a spool which stores the line thereon. The spool is normally stationary, except when fish is taking a run, during which time the spool rotates against the friction of a slip clutch, normally known as a drag. A rotary bail, operated by a crank, winds the line onto the stationary spool during retrieve of a fish, the bail also having a casting position in which the line does not pass around the bail guide, in which position the line is free to strip off the spool around its front edge, all as is well known in the art. Also, spin fishing reels are of two general types, the first being the "open face" type and the other being the same except that a closed housing is added ahead of the spool which has a central aperture through which the line extends. In the latter type the line leaving the spool must always extend forwardly from the spool periphery to the aperture and stripping cannot be prevented if the bail is in casting position. In the open face type, however, stripping can be prevented if the line leaving the spool extends radially therefrom or in a rearward direction from the plane of the front spool face around which the line strips. In this type of reel, some anglers tie the free end of the line to the reel shank, which is normally disposed rearwardly from the front face of the spool which prevents stripping. In a first mode of use and when the angler is ready to fish, he either cuts the knot or unties it and then threads the line through the rod guides and otherwise rigs the terminal end preparatory to casting a lure or the like. As will be apparent, when the terminal end is tied to the reel shank a minimum amount of line is exposed which can be caught by an obstruction, such as a branch, twig, or the like, thus minimizing the possibility of entanglements. Also, the terminal end is readily accessible for rigging rather than lying within the spool and which must be removed therefrom preparatory to rigging. When fishing is terminated at one locus and the angler desires to move to another, particularly if he must move through heavy brush, or the like, he may remove the lure, retrieve the line through the guides and again tie the free end to the reel shank or some portion of the butt which will prevent stripping until he re-rigs the rod.

In a second mode of use some anglers, however, once the rod is rigged, prefer to leave it in such condition when moving from place to place. In this procedure, the lure is hooked to a rod guide or a ring or other device provided for such purpose. The line now extends from the spool periphery, through the guides and rod tip, and thence rearwardly to some point of affixation on the rod. The line will now be locked against stripping provided the reel bail is in retrieving position for the reason that the line is now extending generally radially of the spool and around the bail guide which is always disposed somewhere rearwardly of the front face of the spool. As will be apparent, however, if the bail is in casting position, the line does not extend around the bail guide and hence is free to strip. Thus, in this position of the bail, if any portion of the line forwardly of the reel is caught on an obstruction, a loop of line is stripped from the spool, whcih will require disentanglement, entailing loss of valuable fishing time as well as considerable disconcertment to the angler.

Various line clamps or brakes have been devised for releasably grasping the line as exemplified by U.S. Pat. Nos. 2,791,858; 2,804,711 and 3,045,380. These serve the same purpose as the index finger which holds the line against the rod butt until the cast is initiated. Since these devices are all disposed ahead of the front reel face it will be apparent that the portion of line extending between the front reel face and their positions on the reel butt, if caught on an obstruction, will cause line to strip around the front spool face if the bail is in casting position. Their positions are also critical since the only fingers which can normally be employed during the cast are the thumb and forefinger, the others being in grasping position around the butt to effect swing of the rod. As will become further apparent as the description proceeds, such devices are intended to perform an entirely different function than the present invention.

SUMMARY OF THE INVENTION

A device for spin fishing apparatus is presented which may releasably engage a portion of fishing line and prevent the line from stripping around the front spool face, regardless of the position of the reel bail. In an exemplary form it comprises a U-shaped spring clamp which may be applied to the reel shank, the clamp carrying a resiliently urged jaw or clip which secures the line thereto and which may be released by finger pressure. The jaw may also be employed to carry a spare lure or the like. It thus never functions as a releasable brake employed during the cast and thus could be employed as an accessory to the devices referred to, serving an additional purpose.

The principal object of the invention, accordingly, is to provide a device for use with spin fishing apparatus for releasably clamping a portion of the line at a suitable point at which stripping of the line around the front face of the spool is prevented regardless of whether the bail is in casting position or retrieving position.

Another object is to construct the device in such manner that it is attachable as an accessory to spin fishing apparatus of various dimensions and shapes and more particularly to various reel shanks.

A further object is to provide an accessory which is simple in construction and which may be mass produced at relatively low cost.

Still further objects, advantages and salient features will become more apparent from the detailed description to follow, the appended claims, and the accompanying drawing to now be briefly described.

BRIEF DESCRIPTION OF THE DRAWING

FIG. 1 is a side elevation illustrating the general environment of the subject of the invention;

FIG. 1a is a like elevation of a portion of FIG. 1, showing a different position of parts.

FIG. 2 is a greatly enlarged detail of a prototype in the locus of arrow 2, FIG. 1;

FIG. 2a is side elevation of an alternative and preferred form of the invention, portions being omitted, also in the locus of arrow 2, FIG. 1;

FIG. 3 is a section taken on plane 3—3, FIG. 2;

FIG. 4 is a section taken through a plane parallel to the plane of FIG. 2a;

FIG. 4a is a section, like FIG. 4, illustrating a coated clamp, preferably employed in FIGS. 2a and 4 but omitted therein to simplify the drawing.

Referring now to the drawing, and first to FIG. 1, the general environment of the invention comprises a fishing rod 10, a portion of which is illustrated, having a butt 12 to which is affixed a spinning reel 14 having a mounting shank 16. Reel 14 is provided with a spool 18 containing line 20, a rotary sleeve 22 which carries a U-shaped bail 24, and a crank 26 for rotating the sleeve and bail. The bail has a casting position, as shown, in which the line is free to strip off the outer periphery 28 of the spool and a retrieving position (FIG. 1a) in which the bail is disposed about 90° counterclockwise from that shown in FIG. 1. When in the latter position, the bail picks up the line just forward of the spool and the line passes around a roller or guide groove 30 disposed adjacent one end of the bail, the construction so far described being conventional and well known.

The subject of the invention comprises a clamp 32, as illustrated in FIGS. 1 to 3, to which is affixed a clip device 34, this being of the general form of a conventional alligator clip having members 36, 38 secured together with a pivot pin 40 and urged toward closed position by a torsion spring 42 surrounding the pivot pin. Clamp 32 is provided with ears 44 through which the pivot pin also extends. As will be apparent, when member 38 is depressed, jaw 46 opens and when released the spring closes the jaw. When closed, line 20 extends rearwardly from spool 18, thence beneath jaw 46 and thence forwardly, as illustrated in FIG. 1, and thence through the rod guides and tip (not shown), this being the rigging of the second mode of use previously referred to. In the first mode of use the terminal end of the line is disposed adjacent jaw 46, as illustrated in FIG. 1a. As will be understood, the terminal end of the line, to which is affixed a hook, lure, sinker or the like, is now attached to the rod at some desired point therealong. If the line is now snagged on an object it cannot strip around face 28 of the spool, even though the bail is in the casting position illustrated (open bail) since it extends rearwardly of such face and beneath jaw 46. When member 38 is depressed to release jaw 46, and the terminal end of the line is released from the rod, the forefinger then pinches the line against the butt and at a desired point in the forward cast it is released, permitting the line to strip around face 28 of the spool, as is conventional. As will now be more apparent, the devices of the prior art serve the same function as the index finger just referred to but not the function of preventing stripping when the bail is open and in casting position.

Referring now to FIGS. 2a and 4, clamp 32a may be the same as clamp 32 but instead of employing ears 44, an open loop or bend 44a is provided in which pin 40a nests. A spring member 48 is secured to clamp 32a by a pair of apertured spaced ears 50,50 through which pin 40a extends. Member 48 is provided with a retroverted resilient end 52 which engages member 32a at one side of the pivot pin and a jaw 46a which engages member 32a at the other side of the pivot pin. When a depressing force is applied, as indicated by arrow 54, member 48 rocks around pin 40a and moves jaw 46a away from member 32a. It thus serves the same purpose as jaw 46 and differs principally in that it does not have serrated or toothed jaws and the torsion spring is eliminated since member 48 is inherently a spring, being formed of spring steel or other suitable resilient material.

FIG. 4a illustrates a coating 56 which is preferably employed on member 32a of FIGS. 2a and 4, the construction being otherwise the same. This may be any relatively soft material, such as a plastic which may be applied by dipping and thence setting same. Polyvinyl chloride or chemisol are exemplary plastics. The coating provides an improved grip on the line and also prevents scratching the reel shank when applied thereto. As will be apparent, the coating may also be applied to the construction of FIGS. 2 and 3.

As so far described, the clamp is applied to reel shank 16, this being desirable since shanks do not vary materially in size and shape and one clamp may thus fit various reel shanks. If desired, however, the clamp may be enlarged so that it may be attached to the rod butt, rather than the reel. Its point of attachment should, however, be at some point rearwardly of front face 28 of the spool to prevent stripping of the line as previously described. The actual size of the U-shape clamp of FIGS. 2 and 2a is slightly less than one-half inch across the U-legs and approximately three-sixteenths inch in width which fits the shanks of most fresh water spinning reels.

Alternate positions of affixation of the device have been described, one being on the reel and the other on the rod butt. The former is preferred, however, for the reason to now be set forth. Let it be assumed that the angler has completed fishing and has detached the reel from the rod butt for stowage in a tackle box or the like. If the device is disposed on the rod butt the line is now free to strip from the reel spool. If, however, it is disposed on the reel it cannot strip and the terminal end is adjacent the jaw where it can readily be grasped for rerigging with the rod when the reel is again attached to the rod. As will now be apparent, this further points out a salient difference from the prior art wherein the clamps normally remain on the rod and hence cannot serve the clamping function just referred to when the reel is removed from the rod.

When the reel is removed from the rod or when it remains on the rod in unrigged position, that is, with the terminal end of the line disposed adjacent the reel shank, rather than being threaded through the rod guides, the bail is preferably moved to retrieving position, as illustrated in FIG. 1a, and the terminal end of the line is disposed in groove 30 and thence rearwardly to the clamp.

As so far described, the device is constructed as a retrofit for pre-existing reels. It will be apparent, however, that it could be constructed as an original part of a reel, in which case, the reel body or shank could be constructed to eliminate the detachable U-shaped clamp. Also, while a lever operated jaw has been disclosed it will be apparent that the resilient jaw could be otherwise constructed. For example, it could be a resiliently urged jaw with a free end, as illustrated, and the line could be slipped beneath the jaw, moving the jaw away from its cooperating abutment as the line is disposed therebetween.

What is claimed is:

1. An accessory for use with a spinning reel having a normal stationary spool and line thereon, adapted to be detachably connected to a rod butt by a shank disposed rearwardly from the front face of the reel spool, comprising:

a. a U-shaped resilient clamp adapted to be manually applied by a depressing force, without a tool, to said shank, the resiliency of the legs thereof maintaining same attached thereto, the clamp being removable in like manner by an opposite force, and
b. a line securing device comprising a lever pivoted between its ends to said clamp and extending partially around the outside thereof,
c. said lever having a line engaging jaw at one side of the pivot resiliently urged to a closed position against a portion of the U-shaped resilient clamp, thereby providing a secure engagement between said jaw and said portion of the U-shaped resilient clamp for said line,
d. said lever having a finger engaging portion adapted to be depressed by a finger to open the jaw.

2. An accessory in accordance with claim 1 wherein said U-shaped clamp is provided with a U-shaped bent portion substantially mid-way between the ends of the legs thereof, the pivot being disposed within said U-shaped bent portion.

3. An accessory in accordance with claim 1 including a torsion spring surrounding the pivot for urging said jaw to closed position.

4. An accessory for use with a spinning reel having a normal stationary spool and line thereon, adapted to be detachably connected to a rod butt by a shank disposed rearwardly from the front face of the reel spool, comprising:
a. a U-shaped resilient clamp adapted to be manually applied by a depressing force, without a tool, to said shank, the resiliency of the legs thereof maintaining same attached thereto, the clamp being removable in like manner by an opposite force, said U-shaped clamp being provided with a U-shaped bent portion substantially midway between the ends of the legs thereof,
b. a line securing device comprising a lever pivoted between its ends to said clamp and extending partially around the outside thereof, the pivot being disposed within said U-shaped bent portion,
c. said lever comprising a flat spring having tabs between its ends secured to ends of the pivot, and having a line engaging jaw at one side of the pivot resiliently urged to a closed position against a cooperating abutment, and
d. said lever having a finger engaging portion adapted to be depressed by a finger to open the jaw, said finger engaging portion comprising a retroverted leg engageable with said U-shaped clamp for urging the lever in one direction around the pivot.

5. An accessory for use with a spinning reel having a normal stationary spool and line thereon, adapted to be detachably connected to a rod butt by a shank disposed rearwardly from the front face of the reel spool, comprising:
a. a U-shaped resilient clamp adapted to be manually applied by a depressing force, without a tool, to said shank, the resiliency of the legs thereof maintaining same attached thereto, the clamp being removable in like manner by an opposite force, said U-shaped member being provided with a relatively soft coating of plastic-like material, forming a surface of increased frictional resistance,
b. a line securing device comprising a lever pivoted between its ends to said clamp and extending partially around the outside thereof,
c. said lever having a line-engaging jaw at one side of the pivot resiliently urged to a closed position against a cooperating abutment, and
d. said lever having a finger engaging portion adapted to be depressed by a finger to open the jaw.

* * * * *